US010771882B2

(12) United States Patent
Estrada et al.

(10) Patent No.: US 10,771,882 B2
(45) Date of Patent: Sep. 8, 2020

(54) USER INTERFACE FOR AN EARBUD DEVICE

(71) Applicant: Sony Corporation, Tokyo (JP)

(72) Inventors: Andrew Estrada, Escondido, CA (US); Masahiko Seki, Chiba (JP); Haruhiko Kaneko, Tokyo (JP); Hidetoshi Kurihara, Kanagawa (JP); Masahiro Shimizu, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/119,646

(22) Filed: Aug. 31, 2018

(65) Prior Publication Data

US 2019/0373356 A1 Dec. 5, 2019

Related U.S. Application Data

(60) Provisional application No. 62/680,104, filed on Jun. 4, 2018.

(51) Int. Cl.

*H04M 1/00* (2006.01)
*H04R 1/10* (2006.01)
*H04M 1/60* (2006.01)
*G06F 3/16* (2006.01)

(52) U.S. Cl.

CPC ........... *H04R 1/1041* (2013.01); *G06F 3/165* (2013.01); *H04M 1/6058* (2013.01); *H04R 1/1016* (2013.01); *H04R 2420/07* (2013.01)

(58) Field of Classification Search

USPC ........ 455/575.1, 419; 715/716, 748; 381/74, 381/151, 309

See application file for complete search history.

(56) References Cited

U.S. PATENT DOCUMENTS 7,925,029 B2 * 4/2011 Hollemans ........... H04R 1/1041 381/151
9,167,348 B1 * 10/2015 Vartanian ............. H04R 1/1041
9,924,335 B2 * 3/2018 Hata ....................... H04W 4/16
2008/0130910 A1 6/2008 Jobling et al.
2011/0294489 A1 * 12/2011 Wang .................... G06F 3/0227 455/419
2014/0219467 A1 8/2014 Kurtz (Continued)

FOREIGN PATENT DOCUMENTS

CN 105704619 A 2/2016

OTHER PUBLICATIONS

Google introduces new ways to control the Pixel Buds: Cosmin Vasile Publication; Phonearena; May 15, 2018 https://www.phonearena.com/news/Google-Pixel-Buds-new-gestures_id104957.

(Continued)

*Primary Examiner* — David Q Nguyen

(74) *Attorney, Agent, or Firm* — Trellis IP Law Group, PC

(57) ABSTRACT

Implementations generally relate to a user interface for an earbud device. In some implementations, a method includes detecting contact of a finger of a user on a touch user interface of an earbud device. The method further includes determining a contact pattern based on movement of the finger on the touch user interface. The method further includes mapping the contact pattern to a predetermined command. The method further includes executing the predetermined command based on the mapping.

12 Claims, 7 Drawing Sheets

104
102

100

(56) References Cited

U.S. PATENT DOCUMENTS

| | | | | |
|---|---|---|---|---|
| 2014/0337791 | A1* | 11/2014 | Agnetta | G06F 3/0481 715/784 |
| 2015/0023516 | A1* | 1/2015 | Rabii | H04R 3/00 381/74 |
| 2015/0113432 | A1* | 4/2015 | Jung | G06F 3/04883 715/748 |
| 2016/0191099 | A1* | 6/2016 | Lee | H04B 1/3888 455/575.1 |
| 2016/0205475 | A1* | 7/2016 | Shanmugam | H04R 5/04 381/309 |
| 2016/0253064 | A1* | 9/2016 | Hattori | H04M 1/0281 715/716 |
| 2017/0318376 | A1* | 11/2017 | Honeycutt | A63B 71/0686 |
| 2018/0088761 | A1* | 3/2018 | Schobel | G06F 3/0485 |
| 2018/0275799 | A1* | 9/2018 | Shin | G06F 3/0418 |
| 2019/0297408 | A1* | 9/2019 | Mohammadi | H03K 17/962 |
| 2019/0346969 | A1* | 11/2019 | Yip | G06F 3/0436 |

OTHER PUBLICATIONS

"Tokmate—FB1000ab Black Bluetooth Touch Gesture Control NFC Wireless Headphones HiFi CVC Noise-Cancellation Super Deep Bass Sound with Audio Cable"; Amazon.com https://www.amazon.com/Tokmate-FB1000ab-Bluetooth-Headphones-Noise-Cancellation/dp/B01IR2FZRU.

* cited by examiner

100

700

USER INTERFACE FOR AN EARBUD DEVICE

CROSS REFERENCES TO RELATED APPLICATIONS

This application claims the benefit of U.S. Provisional Patent Application Ser. No. 62/680,104, entitled "Earbuds with intuitive swipe gestures", filed on Jun. 4, 2018, which is hereby incorporated by reference as if set forth in full in this application for all purposes.

BACKGROUND

As earbuds get smaller in size, it is difficult to place buttons or other user input controls on them. Furthermore, most button controls are counter-intuitive to the underlying features, are complex, and not intuitively related to the resulting system behavior. Many earbuds in the market today have phone and music player controls using a combination of buttons, taps, knobs, and the like. These approaches enable the desired controls, but they are difficult for consumers to fully use because the gestures are unrelated to the underlying control features and are therefore hard to remember. Also, it is difficult to put many buttons or controls on a small earbud.

SUMMARY

Implementations generally relate to a user interface for an earbud device. In some implementations, a system includes one or more processors, and includes logic encoded in one or more non-transitory computer-readable storage media for execution by the one or more processors. When executed, the logic is operable to perform operations including detecting contact of a finger of a user on a touch user interface of an earbud device; determining a contact pattern based on movement of the finger on the touch user interface; mapping the contact pattern to a predetermined command; and executing the predetermined command based on the mapping.

With further regard to the system, the contact pattern is an up swipe motion, and where the up swipe motion is associated with engaging a phone call. In some implementations, the contact pattern is a down swipe motion, and where the down swipe motion is associated with disengaging a phone call. In some implementations, the contact pattern is a forward swipe motion, and where the forward swipe motion is associated with starting a playable file. In some implementations, the contact pattern is a backward swipe motion, and where the backward swipe motion is associated with one of stopping a playable file or starting a previous playable file. In some implementations, the logic when executed is further operable to perform operations comprising determining a speed of a swipe motion, and where the speed is associated with fast forwarding a playable file. In some implementations, the contact pattern is a circular swipe motion, and where the circular swipe motion is associated with one of increasing volume or decreasing volume.

In some embodiments, a non-transitory computer-readable storage medium with program instructions thereon is provided. When executed by one or more processors, the instructions are operable to perform operations including detecting contact of a finger of a user on a touch user interface of an earbud device; determining a contact pattern based on movement of the finger on the touch user interface; mapping the contact pattern to a predetermined command; and executing the predetermined command based on the mapping.

With further regard to the computer-readable storage medium, in some implementations, the contact pattern is an up swipe motion, and where the up swipe motion is associated with engaging a phone call. In some implementations, the contact pattern is a down swipe motion, and where the down swipe motion is associated with disengaging a phone call. In some implementations, the contact pattern is a forward swipe motion, and where the forward swipe motion is associated with starting a playable file. In some implementations, the contact pattern is a backward swipe motion, and where the backward swipe motion is associated with one of stopping a playable file or starting a previous playable file. In some implementations, the instructions when executed are further operable to perform operations comprising determining a speed of a swipe motion, and where the speed is associated with fast forwarding a playable file. In some implementations, the contact pattern is a circular swipe motion, and where the circular swipe motion is associated with one of increasing volume or decreasing volume.

In some implementations, a computer-implemented method includes detecting contact of a finger of a user on a touch user interface of an earbud device. The method further includes determining a contact pattern based on movement of the finger on the touch user interface. The method further includes mapping the contact pattern to a predetermined command. The method further includes executing the predetermined command based on the mapping.

With further regard to the method, in some implementations, the contact pattern is an up swipe motion, and where the up swipe motion is associated with engaging a phone call. In some implementations, the contact pattern is a down swipe motion, and where the down swipe motion is associated with disengaging a phone call. In some implementations, the contact pattern is a forward swipe motion, and where the forward swipe motion is associated with starting a playable file. In some implementations, the contact pattern is a backward swipe motion, and where the backward swipe motion is associated with one of stopping a playable file or starting a previous playable file. In some implementations, the logic when executed is further operable to perform operations comprising determining a speed of a swipe motion, and where the speed is associated with fast forwarding a playable file.

A further understanding of the nature and the advantages of particular implementations disclosed herein may be realized by reference of the remaining portions of the specification and the attached drawings.

DETAILED DESCRIPTION

Implementations described herein provide a user interface for an earbud device. In various embodiments, the user interface enables a user to intuitively control earbud devices.

In some implementations, the earbud device detects the contact of a finger of a user on a touch user interface of the earbud device. The earbud device determines a contact pattern based on the movement of the finger on the touch user interface (e.g., up swipe, down swipe, forward swipe, backward swipe, circular swipe, etc.). The earbud device then maps the contact pattern to a predetermined command (e.g., up swipe corresponds to answering an incoming phone call, etc.). The earbud device then executes the predetermined command based on the mapping (e.g., answering incoming phone call after detecting an up swipe, etc.).

Figure 1:
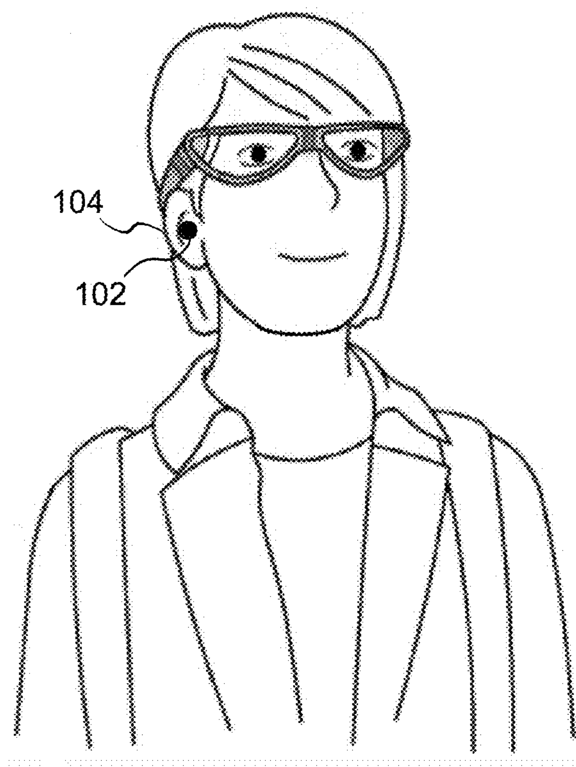
FIG. 1 illustrates an example user wearing earbuds, according to some implementations.

FIG. 1 illustrates an example user 100 wearing earbuds, according to some implementations. Shown is a right earbud 102 in the user's right ear 104. The left earbud is not shown. The term earbud device may refer to either earbud or to the set of earbuds, depending on the context. For ease of illustration, earbud 102 is shown as a set of wireless earbuds with no connecting wire between the left earbud and the right earbud. However, the earbud device may alternatively have a wired connection between the two earbuds of the earbud device.

In various embodiments, the earbuds are equipped with a touch user interface or touch surface that detects swipe gestures or motions as part of the user interface. As described in more detail herein, these swipe motions are intuitive to the user. In some embodiments, both earbuds of a set may have a touch user interface for controlling the earbuds. Whether the earbuds are wired or wireless, the system enables the user to control the earbud device by swiping the controls of either earbud.

In some embodiments, the earbud device communicates with another device (e.g., smartphone, tablet, notebook computer, etc.), and the connection may be wireless or wired, depending on the particular implementation. As such, the user can control the other device based at least in part on swipe motions on the touch user interface of the earbud device.

While some embodiments are described herein in the context of earbuds, these embodiments may also be applied to other small wearable devices with touch surface controls (e.g., smart glasses, smart watches, etc.). Operations of the earbuds are described in more detail herein, for example, in connection with FIG. 2.

Figure 2:
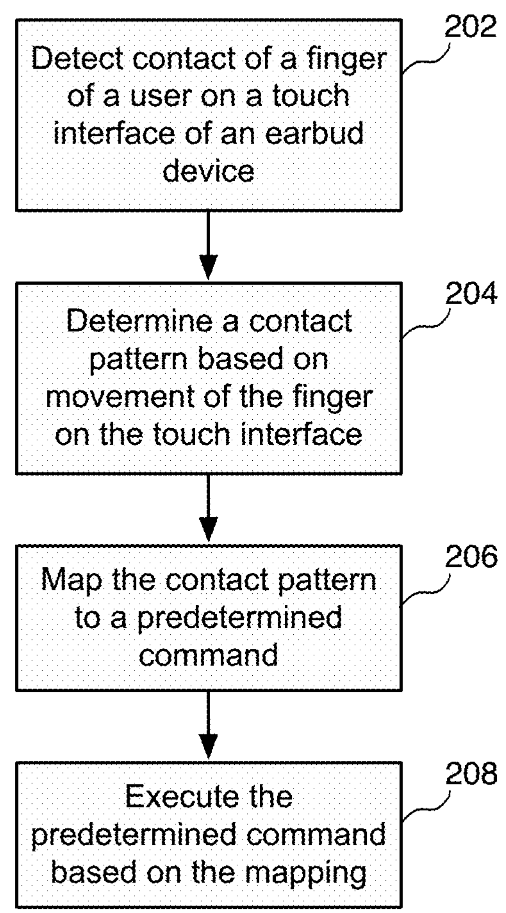
FIG. 2 illustrates an example flow diagram for controlling an earbud device, according to some implementations.

FIG. 2 an example flow diagram for controlling an earbud device, according to some implementations. Referring to both FIGS. 1 and 2, a method is initiated at block 202, where an earbud device such as earbud 102 detects contact of a finger of a user on the touch user interface of an earbud device.

At block 204, the system determines a contact pattern based on the movement of the finger on the touch user interface. As indicated above, the earbud device includes a touch user interface that the user can swipe in various directions. Example contact patterns (e.g., up, down, forward, backward, circular, etc.) are described in more detail herein in connection with FIGS. 3, 4, and 5, for example.

Figure 3:
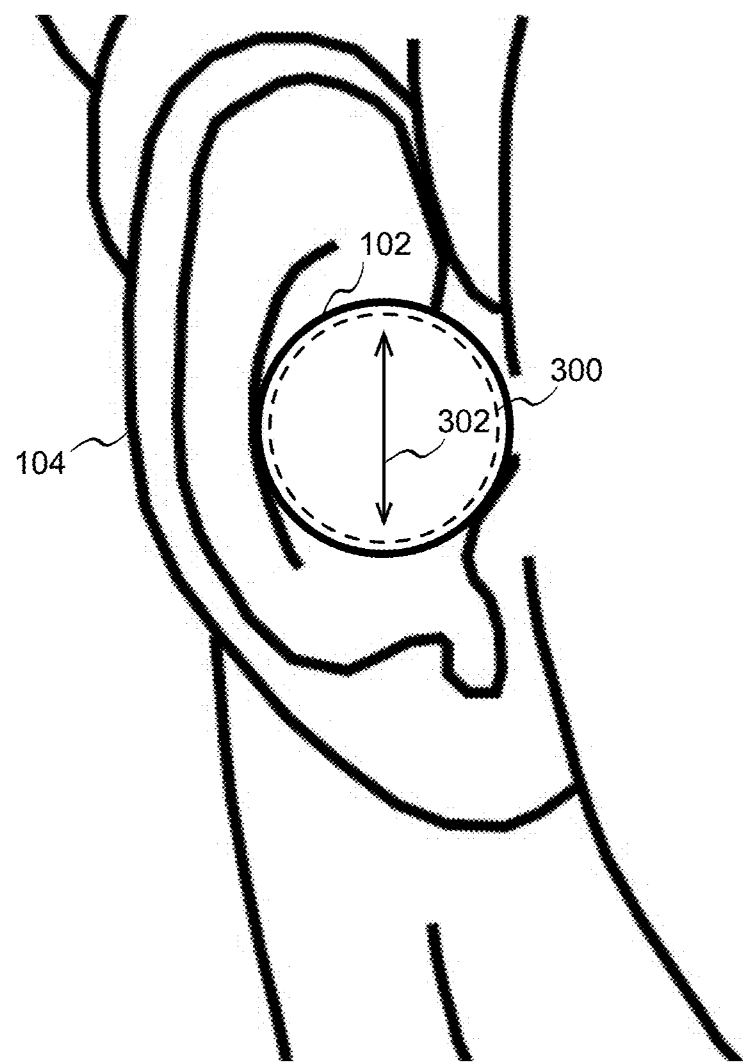
FIG. 3 illustrates a vertical contact pattern, according to some implementations.

FIG. 3 illustrates vertical contact pattern, according to some implementations. Shown is earbud 102 of FIG. 1 with a touch user interface 300. Also shown is a vertical contact pattern 302, where the user swipes with an up swipe motion or a down swipe motion. Operations associated with either an up swipe motion or a down swipe motion are described in more detail herein.

Figure 4:
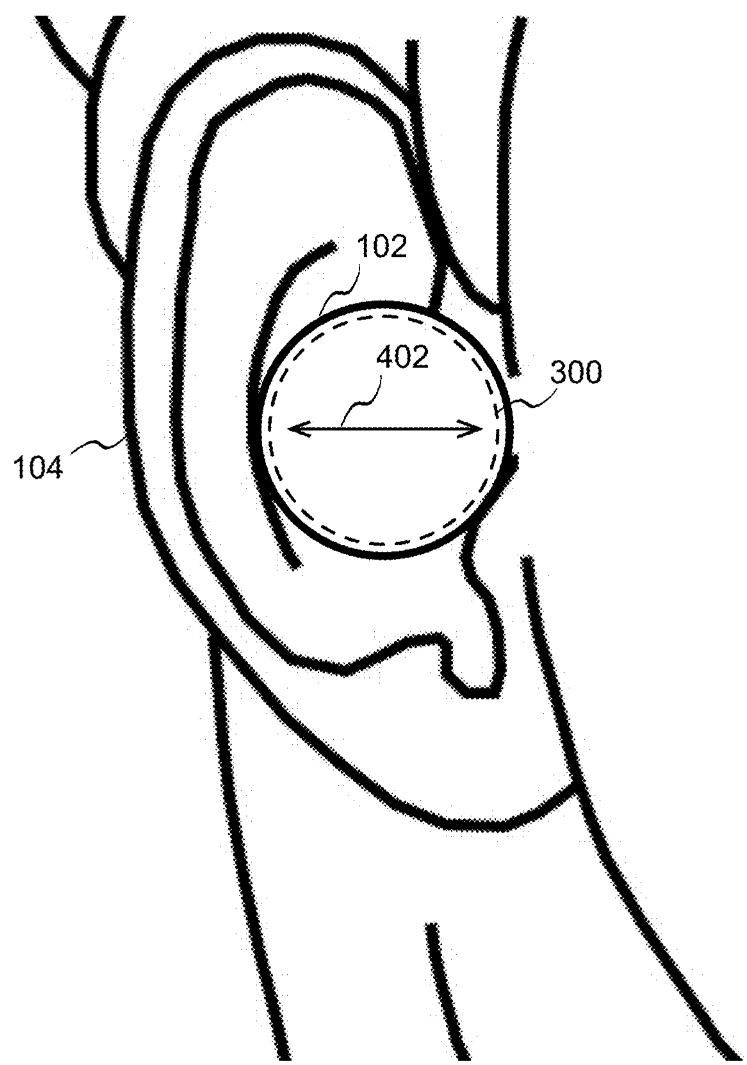
FIG. 4 illustrates a horizontal contact pattern, according to some implementations.

FIG. 4 illustrates horizontal contact pattern, according to some implementations. Shown again is earbud 102 of FIG. 1 with touch user interface 300. Also shown is a horizontal contact pattern 402, where the user swipes with a forward swipe motion or a backward swipe motion. For example, for a forward swipe motion, the user makes finger contact with a finger on the rear of touch user interface 300 (e.g., closer to the portion of touch user interface 300 at the rear of the user's ear). The user then swipes the finger forward, toward the front of touch user interface 300 (e.g., closer to the portion of touch user interface 300 at the front of the user's ear). For a backward swipe motion, the user makes finger contact with a finger on the front of touch user interface 300 (e.g., closer to the portion of touch user interface 300 at the front of the user's ear). The user then swipes the finger backward, toward the back of touch user interface 300 (e.g., closer to the portion of touch user interface 300 at the back of the user's ear). Operations associated with either a forward swipe motion or a backward swipe motion are described in more detail herein.

Figure 5:
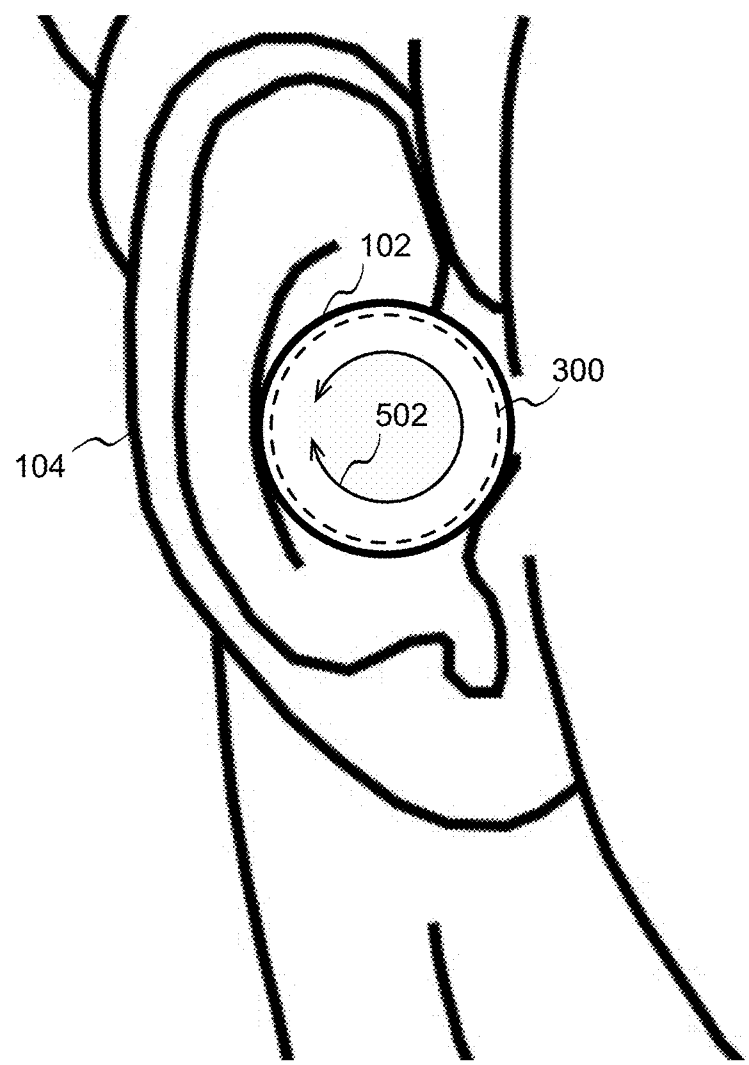
FIG. 5 illustrates a circular contact pattern, according to some implementations.

FIG. 5 illustrates a circular contact pattern, according to some implementations. Shown again is earbud 102 of FIG. 1 with touch user interface 300. Also shown is a circular contact pattern 502, where the user swipes with a clockwise swipe motion or a counter-clockwise swipe motion. Operations associated with either a clockwise swipe motion or a counter-clockwise swipe motion are described in more detail herein.

At block 206, the system maps the contact pattern to a predetermined command. In some embodiments, earbud 102 accesses the predetermined commands from a suitable memory location, which may reside on earbud 102 or on another system (e.g., smartphone, tablet, etc.). Such predetermined commands may be in a look-up table or library or other suitable data structure.

Figure 6:
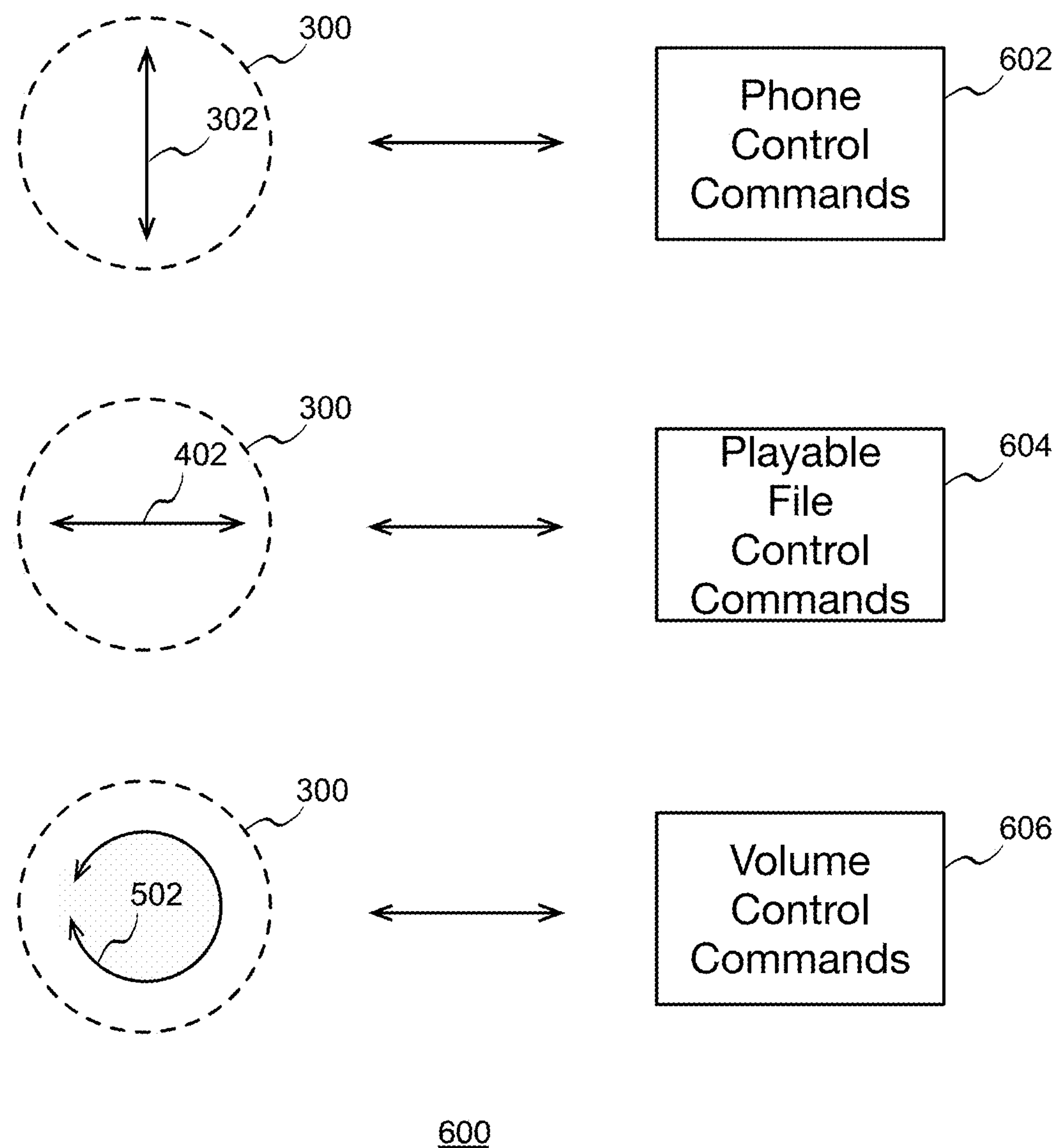
FIG. 6 illustrates various contact patterns and corresponding control commands, according to some implementations.

FIG. 6 illustrates various contact patterns and corresponding control commands, according to some implementations. Shown is touch user interface 300 with different contact patterns. Vertical contact pattern 302 maps to various phone control commands 602. Horizontal contact pattern 402 maps to various playable file control commands 604. Circular contact pattern 502 maps to various volume control commands 606. Specific example contact patterns (e.g., up swipe motion, down swipe motion, etc.) and mapped commands and associated operations are described in more detail herein.

At block 208, the system executes the predetermined command based on the mapping. Example predetermined commands are described in more detail herein.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

As indicated herein, in some embodiments, the earbud device maps vertical contact patterns to phone control commands. For example, in various embodiments, the contact pattern is an up swipe motion, where the up swipe motion is associated with engaging a phone call. In some embodiments, if a phone call is incoming, an up swipe motion is associated with an engage command that answers the phone call. If there is no incoming phone call, an up swipe motion is associated with an engage command that initiates a phone call. These swipe motions are intuitive, because they are analogous to "picking up" a handset on a traditional land line telephone.

In various embodiments, the contact pattern is a down swipe motion, where the down swipe motion is associated with disengaging a phone call. In some embodiments, if a phone call is incoming, a down swipe motion is associated with a disengage command that rejects the phone call. If a phone call is active, a down swipe motion is associated with a disengage command that terminates the phone call. These swipe motions are intuitive, because they are analogous to "hanging up" a handset on a traditional land line telephone (or ignoring an incoming call on a smartphone).

As indicated herein, in some embodiments, the earbud device maps horizontal contact patterns to playable file control commands. Such playable file control commands may control a media player that is integrated with the earbud device or a remote media player integrated with another device (e.g., smartphone, tablet, notebook computer, etc.). For example, in various embodiments, the contact pattern is a forward swipe motion, where forward swipe motion is associated with starting a playable file. In some embodiments, if a playable file (e.g., music file, video file, etc.) is inactive, a forward swipe motion is associated with a forward command that starts the playable file. If a playable file is active, a forward command is associated with a forward command that skips to a next playable file and starts the next playable file. For example, if there is a playlist or queue of songs to be played and a song in the queue is being played, a forward swipe motion causes the currently played song to stop and the next song in the queue to start. In some embodiments, multiple forward swipe motions result in multiple skips forward in the queue.

In various embodiments, the contact pattern is a backward swipe, where the backward swipe motion is associated with one of stopping a playable file or starting a previous playable file. In some embodiments, if a playable file is active, a backward swipe motion is associated with a back command that stops the playable file. If a playable file is inactive, a backward swipe motion is associated with a back command that starts a previous playable file. For example, if there is a queue of songs to be played, a backward swipe motion causes the previous song in the queue to be played (as opposed to the song that is currently queued to be played). In some embodiments, multiple backward swipe motions result in multiple skips backward in the queue.

In some embodiments, the earbud device maps the speed of a given swipe motion to predetermined commands. In various embodiments, the system determines the speed of a swipe motion, where the speed is associated with fast forwarding a playable file. For example, in some embodiments, a fast forward swipe may be associated with a command to fast forward, and a fast backward swipe may be associated with a command to play in reverse or fast reverse.

As indicated herein, in some embodiments, the earbud device maps circular contact patterns to volume commands. For example, in various embodiments, the contact pattern is a circular swipe motion, where the circular swipe motion is associated with one of increasing volume or decreasing volume.

In some embodiments, a clockwise circular swipe motion is associated with a volume command to increase volume. A counter-clockwise circular swipe motion is associated with a volume command to decrease volume. The particular convention may change depending on the particular implementation. For example, in some embodiments, a counter-clockwise circular swipe motion may be associated with a volume command to increase volume, and a clockwise circular swipe motion is associated with a volume command to decrease volume.

While some types of contact patterns/swipe motions are described, the earbud device may also support other types of contact patterns/swipe motions, including single and multiple taps.

Embodiments described herein provide various benefits. For example, embodiments provide a touch user interface for small wearable devices such as earbud devices, where use of the touch user interface is intuitive to the user and intuitively related to resulting system behavior. This encourages more features to be used by the user. The controls are easily manipulated by touch even when the device is worn in the ears and cannot be seen by the user.

Figure 7:
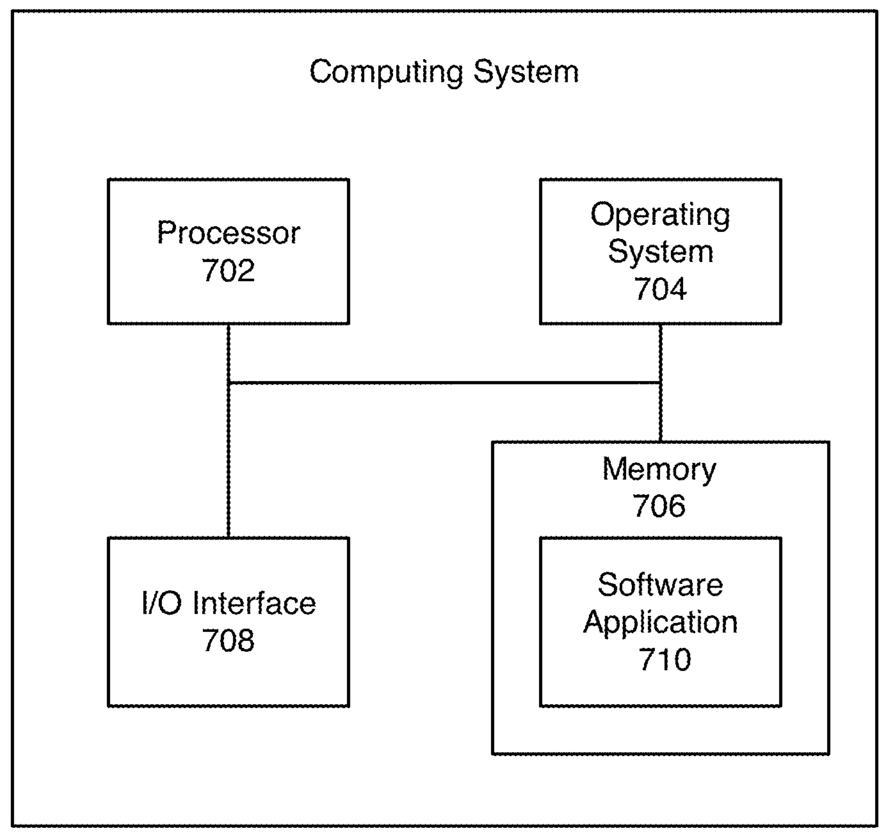
FIG. 7 illustrates a block diagram of an example computing system, which may be used for some implementations described herein.

FIG. 7 illustrates a block diagram of an example computing system 700, which may be used for some implementations described herein. For example, computing system 700 may be used to implement earbud 102 of FIG. 1, as well as to perform implementations described herein. In some implementations, computing system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of computing system 700 or any suitable processor or processors associated with computing system 700 or any suitable system may perform the steps described. Implementations described herein may be carried out on a user device, on a server, or a combination of both.

Computing system 700 also includes a software application 710, which may be stored on memory 706 or on any other suitable storage location or computer-readable medium. Software application 710 provides instructions that enable processor 702 to perform the implementations described herein and other functions. Software application may also include an engine such as a network engine for performing various functions associated with one or more networks and network communications. The components of computing system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computing system 700 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:

one or more processors; and logic encoded in one or more non-transitory computer-readable storage media for execution by the one or more processors and when executed operable to perform operations comprising:

detecting contact of a finger of a user on a touch user interface of an earbud device;

determining a contact pattern based on movement of the finger on the touch user interface, wherein the contact pattern is associated with one of increasing volume or decreasing volume if the contact pattern is a circular swipe motion on the touch user interface of the earbud device, wherein the contact pattern is associated with engaging a phone call if the contact pattern is an upward vertical swipe motion on the touch user interface of the earbud device, wherein the contact pattern is associated with terminating an active phone call if the contact pattern is an downward vertical swipe motion on the touch user interface of the earbud device, wherein the upward vertical swipe motion is detected when the finger of the user contacts a bottom of the touch user interface and swipes vertically upward to a top of the touch user interface, and wherein the downward vertical swipe motion is detected when the finger of the user contacts the top of the touch user interface and swipes vertically downward to the bottom of the touch user interface;

mapping the contact pattern to a predetermined command; and executing the predetermined command based on the mapping.

2. The system of claim 1, wherein the contact pattern is a forward swipe motion, and wherein the forward swipe motion is associated with starting a playable file.

3. The system of claim 1, wherein the contact pattern is a backward swipe motion, and wherein the backward swipe motion is associated with one of stopping a playable file or starting a previous playable file.

4. The system of claim 1, wherein the logic when executed is further operable to perform operations comprising determining a speed of a swipe motion, and wherein the speed is associated with fast forwarding a playable file.

5. A non-transitory computer-readable storage medium with program instructions stored thereon, the program instructions when executed by one or more processors are operable to perform operations comprising:

detecting contact of a finger of a user on a touch user interface of an earbud device;

determining a contact pattern based on movement of the finger on the touch user interface, wherein the contact pattern is associated with one of increasing volume or decreasing volume if the contact pattern is a circular swipe motion on the touch user interface of the earbud device, wherein the contact pattern is associated with engaging a phone call if the contact pattern is an upward vertical swipe motion on the touch user interface of the earbud device, wherein the contact pattern is associated with terminating an active phone call if the contact pattern is an downward vertical swipe motion on the touch user interface of the earbud device, wherein the upward vertical swipe motion is detected when the finger of the user contacts a bottom of the touch user interface and swipes vertically upward to a top of the touch user interface, and wherein the downward vertical swipe motion is detected when the finger of the user contacts the top of the touch user interface and swipes vertically downward to the bottom of the touch user interface;

mapping the contact pattern to a predetermined command; and executing the predetermined command based on the mapping.

6. The computer-readable storage medium of claim 5, wherein the contact pattern is a forward swipe motion, and wherein the forward swipe motion is associated with starting a playable file.

7. The computer-readable storage medium of claim 5, wherein the contact pattern is a backward swipe motion, and wherein the backward swipe motion is associated with one of stopping a playable file or starting a previous playable file.

8. The computer-readable storage medium of claim 5, wherein the instructions when executed are further operable to perform operations comprising determining a speed of a swipe motion, and wherein the speed is associated with fast forwarding a playable file.

9. A computer-implemented method comprising:

detecting contact of a finger of a user on a touch user interface of an earbud device;

determining a contact pattern based on movement of the finger on the touch user interface, wherein the contact pattern is associated with one of increasing volume or decreasing volume if the contact pattern is a circular swipe motion on the touch user interface of the earbud device, wherein the contact pattern is associated with engaging a phone call if the contact pattern is an upward vertical swipe motion on the touch user interface of the earbud device, wherein the contact pattern is associated with terminating an active phone call if the contact pattern is an downward vertical swipe motion on the touch user interface of the earbud device, wherein the upward vertical swipe motion is detected when the finger of the user contacts a bottom of the touch user interface and swipes vertically upward to a top of the touch user interface, and wherein the downward vertical swipe motion is detected when the finger of the user contacts the top of the touch user interface and swipes vertically downward to the bottom of the touch user interface;

mapping the contact pattern to a predetermined command; and executing the predetermined command based on the mapping.

10. The method of claim 9, wherein the contact pattern is a forward swipe motion, and wherein the forward swipe motion is associated with starting a playable file.

11. The method of claim 9, wherein the contact pattern is a backward swipe motion, and wherein the backward swipe motion is associated with one of stopping a playable file or starting a previous playable file.

12. The method of claim 9, further comprising determining a speed of a swipe motion, and wherein the speed is associated with fast forwarding a playable file.

* * * * *